(12) United States Patent
Christiansen, Jr.

(10) Patent No.: US 12,311,828 B2
(45) Date of Patent: May 27, 2025

(54) INTERCHANGEABLE CARGO STRAP SYSTEM

(71) Applicant: Von Roy Christiansen, Jr., Prescott, AZ (US)

(72) Inventor: Von Roy Christiansen, Jr., Prescott, AZ (US)

( * ) Notice: Subject to any disclaimer, the term of this patent is extended or adjusted under 35 U.S.C. 154(b) by 3 days.

(21) Appl. No.: 18/233,309

(22) Filed: Aug. 12, 2023

(65) Prior Publication Data

US 2024/0051452 A1 Feb. 15, 2024

Related U.S. Application Data

(60) Provisional application No. 63/397,656, filed on Aug. 12, 2022.

(51) Int. Cl.
*B60P 7/08* (2006.01)

(52) U.S. Cl.
CPC ..................... *B60P 7/083* (2013.01)

(58) Field of Classification Search
CPC .............................. B60P 7/083; B60P 7/0823
See application file for complete search history.

(56) References Cited

U.S. PATENT DOCUMENTS

| | | | | |
|---|---|---|---|---|
| 3,120,946 A | * | 2/1964 | McCormack | B66C 1/18 24/71 TD |
| 5,058,243 A | * | 10/1991 | Rasmussen | B66C 1/18 294/82.11 |
| 5,836,631 A | * | 11/1998 | Coe | B66C 1/18 294/82.12 |

* cited by examiner

*Primary Examiner* — David M Upchurch
(74) *Attorney, Agent, or Firm* — John D. Tran; Rhema Law Group

(57) ABSTRACT

An interchangeable cargo strap system and method of manufacture can include: providing a custom bracket, the custom bracket comprises a first hole pair and a second hole pair, the first hole pair extended through a first side, extended through a second side, and positioned near a top of the custom bracket, the second hole pair extended through the first side, extended through the second side, and positioned near a bottom of the custom bracket; coupling a first anchor rod to the first hole pair of the custom bracket for coupling a terminal attachment to the custom bracket; and coupling a second anchor rod to the second hole pair of the custom bracket for coupling a cargo strap to the custom bracket.

17 Claims, 3 Drawing Sheets

INTERCHANGEABLE CARGO STRAP SYSTEM

CROSS-REFERENCE TO RELATED APPLICATIONS

This claims priority benefit to all common subject matter of U.S. Provisional Patent Application 63/397,656 filed Aug. 12, 2022. The content of this applications is incorporated herein by reference in its entirety.

TECHNICAL FIELD

This disclosure relates to cargo straps, more particularly to cargo strap systems with interchangeable terminal attachments.

BACKGROUND

Cargo straps are used to secure loads for their simplicity, ease of use, ability to strongly and securely restrain cargo, and for their improvements to safety. While other methods of securing cargo are used, cargo straps have distinguished themselves in the professional shipping world.

The cargo strap industry is subjected to unique pressures which are critical to market success of improvements to the technology. For example, improved cargo straps should be easy to produce, easy to maintain and use, provide meaningful improvements to existing technologies, and be inexpensive.

Prior developments in cargo strap technologies generally employ straps with terminal attachments that can hook directly to a cargo tie-downs on truck beds, trailers, or other surfaces where cargo is stored and transported. These cargo tie-downs can come in many shapes and sizes and can be customizable for the specific cargo that is transported.

With the plurality of different cargo tie-downs available one problem with the prior developments emerges; that being, a cargo strap needs to have a compatible terminal attachment for the cargo tie-down to function properly and safely. Cargo straps have around ten to fifteen different terminal attachments which interface with specific cargo tie-downs.

Prior developments provided a securely attached terminal attachment to the end of each cargo strap, from the factory. While providing a safe and secure terminal attachment, many straps were needed if more than one cargo tie-down were used. Depending on the task at hand, one never really knew which strap they might need.

Typically, one might be required to carry at least three or four different types of cargo straps in order to anticipate the specific cargo tie-down encountered. Even so, many times one must make do with what they have, sometimes at the expense of safety and security of the restrained load. Having a strap with just the right terminal attachment can sometimes make all the difference in the world when trying to secure cargo quickly and safely.

Solutions have been long sought but prior developments have not taught or suggested any complete solutions, and solutions to these problems have long eluded those skilled in the art. Thus, there remains a considerable need for devices and methods that can provide a solution to the need to carry multiple different straps in order to interface with the multitude of cargo tie-downs used.

SUMMARY

An interchangeable cargo strap system and methods of production, providing interchangeable terminal attachments for use with multiple different cargo tie-downs, are disclosed. The cargo strap system and methods can include: providing a custom bracket, the custom bracket comprises a first hole pair and a second hole pair, the first hole pair extended through a first side, extended through a second side, and positioned near a top of the custom bracket, the second hole pair extended through the first side, extended through the second side, and positioned near a bottom of the custom bracket; coupling a first anchor rod to the first hole pair of the custom bracket for coupling a terminal attachment to the custom bracket; and coupling a second anchor rod to the second hole pair of the custom bracket for coupling a cargo strap to the custom bracket.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The interchangeable cargo strap system is illustrated in the figures of the accompanying drawings which are meant to be exemplary and not limiting, in which like reference numerals are intended to refer to like components, and in which.

DETAILED DESCRIPTION

Figure 1:
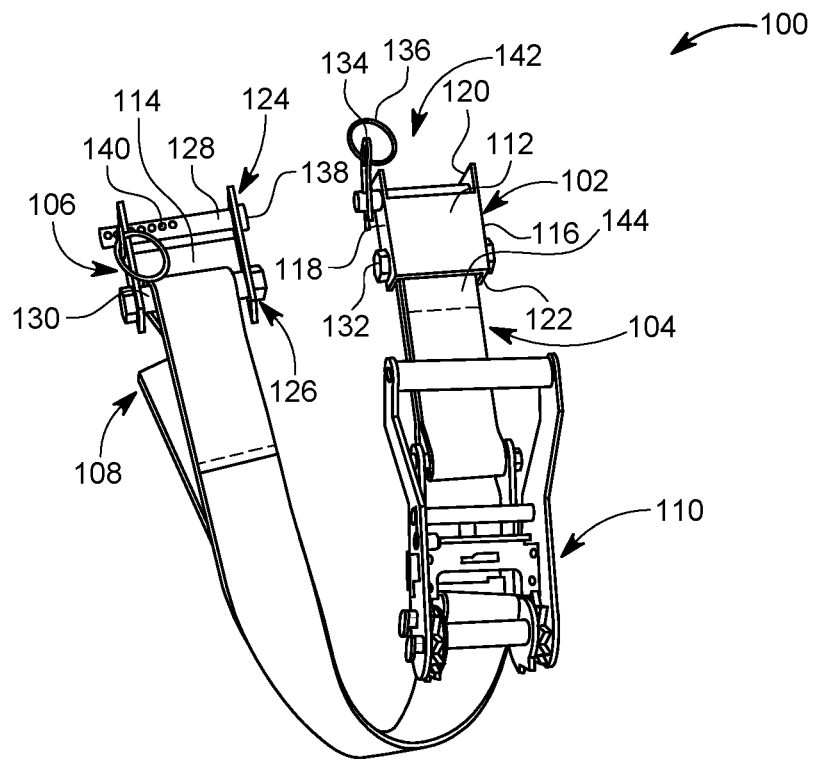
FIG. 1 is an isometric view of the interchangeable cargo strap system configured with no terminal attachments.

In the following description, reference is made to the accompanying drawings that form a part hereof, and in which are shown by way of illustration, embodiments in which the interchangeable cargo strap system may be practiced. It is to be understood that other embodiments may be utilized and structural changes may be made without departing from the scope of the interchangeable cargo strap system.

When features, aspects, or embodiments of the interchangeable cargo strap system are described in terms of steps of a process, an operation, a control flow, or a flow chart, it is to be understood that the steps can be combined, performed in a different order, deleted, or include additional steps without departing from the interchangeable cargo strap system as described herein.

The interchangeable cargo strap system is described in sufficient detail to enable those skilled in the art to make and use the interchangeable cargo strap system and provide numerous specific details to give a thorough understanding of the interchangeable cargo strap system; however, it will be apparent that the interchangeable cargo strap system may be practiced without these specific details.

In order to avoid obscuring the interchangeable cargo strap system, some well-known system configurations and descriptions are not disclosed in detail. Likewise, the drawings showing embodiments of the system are semi-diagrammatic and not to scale and, particularly, some of the dimensions are for the clarity of presentation and are shown greatly exaggerated in the drawing FIGs.

As used herein, the term system is defined as a device or method depending on the context in which it is used. For expository purposes, the term "horizontal" as used herein is defined as a plane perpendicular to the plane or surface of the front side, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane. As used herein, the term "couple" or "coupled" means a direct or indirect physical connection between elements.

Referring now to FIG. 1, therein is shown an isometric view of an interchangeable cargo strap system 100, also referred to herein as the cargo strap system 100, configured with no terminal attachments, such as those shown in FIGS. 2, 3 and 4 below. The cargo strap system 100 is shown having custom brackets coupled to cargo straps.

More particularly, a first custom bracket 102 can be coupled to a first cargo strap 104 and a second custom bracket 106 can be coupled to a second cargo strap 108. The first custom bracket 102 and the second custom bracket 106 can be coupled to a ratchet 110 through the first cargo strap 104 and the second cargo strap 108, respectively.

The first cargo strap 104 and the second cargo strap 108 can be directly attached to the ratchet 110. The custom brackets can include a front side 112, a back side 114, a right side 116, a left side 118, a top side 120, and a bottom side 122.

The custom brackets can further include two hole pairs extending through the right side 116 and the left side 118 including a first hole pair 124 near the top side 120 and a second hole pair 126 near the bottom side 122.

The first hole pair 124 and the second hole pair 126 can receive an anchor rod such as a through pin 128 or a bolt 130. As depicted, both the first custom bracket 102 and the second custom bracket 106 are both shown with the bolts 130 as an anchor rod extending through the second hole pair 126 and with the through pins 128 as an anchor rod extending through the first hole pair 124.

It is contemplated that the bolt 130 and the through pin 128 could be interchanged within the first hole pair 124 and the second hole pair 126 as needed. The bolt 130 can be fixed more permanently and can be used to anchor the cargo straps to the custom brackets as changes between the cargo straps and the custom bracket are less frequently encountered.

However, it has been discovered that the through pin 128 utilized with the first hole pair 124 improves the cargo strap system 100 by allowing fast and easy change of the terminal attachments without the difficulty of changing cargo straps or carrying multiple different cargo straps.

The bolt 130 can be affixed with a nut 132 while the through pin 128 can be affixed with a quick release pin 134 having a keyring loop 136.

The through pin 128, like the bolt 130, is shown having a widened head 138 at the end opposite the quick release pin 134. The widened head 138 can prevent the through pin 128 from sliding completely through the first hole pair 124, and will catch on the right side 116 or the left side 118 at the widened head 138. The through pin 128 is further shown with multiple holes 140 down a length of the through pin 128.

The multiple holes 140 can allow for a custom length through pin 128 or for a narrower terminal attachment to be secured even when the custom bracket is wider than the terminal attachment. Furthermore, the multiple holes 140 can allow a narrow custom bracket to be used with the same through pin 128.

The custom brackets are further depicted with a notch 142 cut out of the front side 112 and the back side 114 exposing the right side 116 and the left side 118 therefrom, and leaving the first hole pair 124 extended vertically away from both the front side 112 and the back side 114. It has been discovered that the notch 142 can provide the terminal attachment a range of motion over 180 degrees allowing for difficult attachments without binding. The exposed portions of the right side 116 and the left side 118 extend up away from the front side 112 to provide greater flexibility in the type and function of the terminal attachment.

The custom brackets are yet further depicted with the front side 112 covering the left side 118 and the right side 116 near the bottom side 122 and near the second hole pair 126 used to couple the custom bracket to the cargo strap. It has been discovered that the front side 112 without a notch exposing the second hole pair 126 allows the custom bracket to align itself with the cargo strap providing an easy gripping and handling mechanism.

As will be appreciated, the first custom bracket 102 is depicted with the front side 112 facing the viewer while the second custom bracket 106 is depicted with the back side 114 facing the viewer. The second custom bracket 106 shows one contemplated method of manufacturing the custom bracket by bending the right side 116 and the left side 118 to an angle substantially perpendicular to the back side 114 so that the left side 118 and the right side 116 extend out away from the back side 114. The right side 116 and the left side 118 each individually form an angle of substantially 270 degrees with the front side 112.

The second hole pair 126 is coupled to the cargo strap with the bolt 130 extending through a strap loop 144 in the cargo strap. The strap loop 144 can be stitched into the cargo strap and be wide enough to receive the bolt 130 therethrough.

The custom brackets enable the cargo strap system 100 to be adaptable to virtually any ratchet strap through the second hole pair 126. The first hole pair 124 can accept endpoint tools or terminal attachments using the through pin 128 extended through the first hole pair 124 to secure the cargo strap system 100 onto nearly any format of cargo tie-down on truck beds, trailers, or other surfaces where cargo is stored and transported. This greater utility is simultaneously achieved while also taking up much less space and reducing weight in a user's bag or sidebox.

Figure 2:
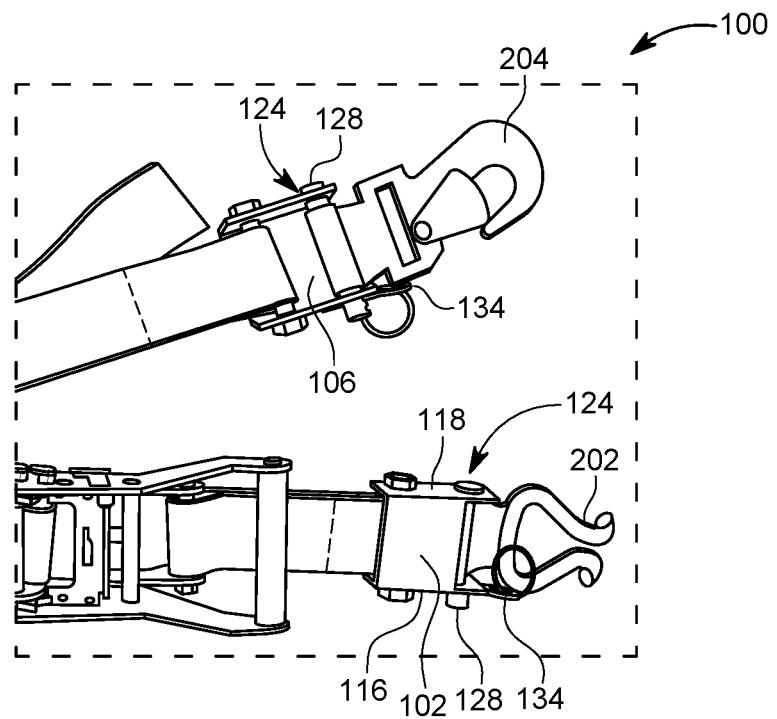
FIG. 2 is an isometric view of the cargo strap system of FIG. 1 configured with a hook attachment and a clip attachment.

Referring now to FIG. 2, therein is shown an isometric view of the cargo strap system 100 of FIG. 1 configured with a hook attachment 202 and a clip attachment 204. The hook attachment 202 and the clip attachment 204 are examples of terminal attachments, which can be coupled to the custom bracket. The terminal attachments can be of any form compatible with a cargo tie-down. This includes clips and hooks as shown but could also include latches, bolts, and lashings.

As depicted, the hook attachment 202 is coupled with the through pin 128 through the first hole pair 124 of the first custom bracket 102 while the clip attachment 204 is coupled with the through pin 128 through the first hole pair 124 of the second custom bracket 106. The through pin 128 is fixed in the custom bracket with the quick release pin 134 in both cases.

The terminal attachments can fit within the custom bracket seamlessly between the left side 118 and the right side 116 to secure the terminal attachment safely with the through pins 128 within the first hole pair 124. The convenience of the custom brackets enable them to be adaptable to virtually any cargo strap and any terminal attachment.

Moreover, the through pin 128 together with the quick release pin 134 ensure that the custom brackets will not be loosened while in use with the terminal attachment. As such, the entire interchangeable strap is able to more easily secure cargo on a trailer or in a back of the truck without taking up as much space or being as cumbersome as a traditional strap.

Figure 3:
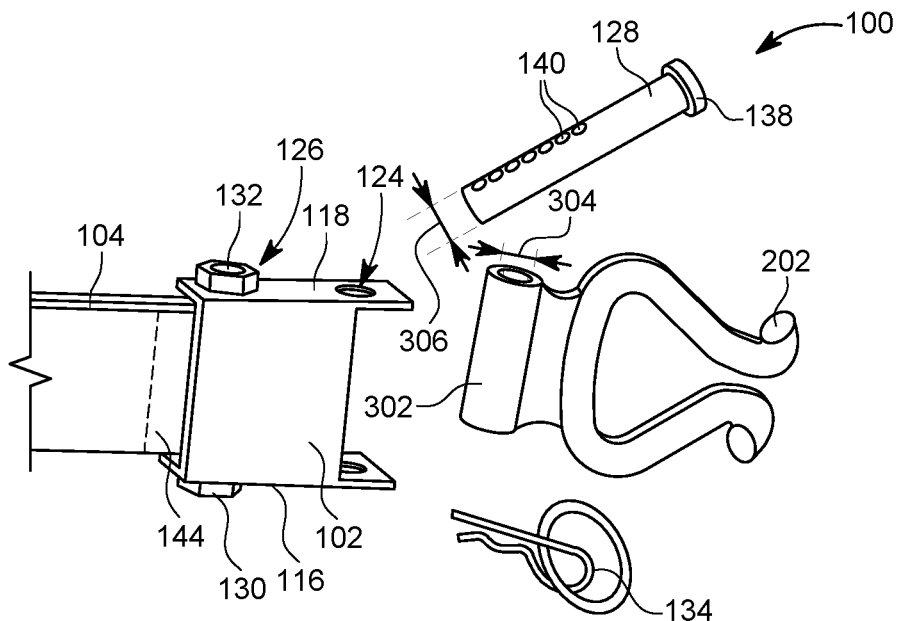
FIG. 3 is an isometric view of the cargo strap system of FIG. 1 in an unassembled configuration.

Referring now to FIG. 3, therein is shown an isometric view of the cargo strap system 100 of FIG. 1 in an unassembled configuration. The first custom bracket 102 is shown with the through pin 128, the hook attachment 202, and the quick release pin 134 disassembled and with the first hole pair 124 empty.

The through pin 128 is shown with the widened head 138 at one end and the multiple holes 140 along its length that allow the quick release pin 134 to be placed at multiple different locations. Furthermore, the multiple holes 140 also allow the use of multiple quick release pins 134 if desired.

The hook attachment 202, together with other terminal attachments, can have a tube connection 302. The tube connection 302 can have a width wide enough to extend between the first hole pair 124 without touching either the right side 116 or the left side 118. In other configurations the tube connection 302 will extend between the first hole pair 124 and touch both the right side 116 and the left side 118 providing friction to the rotation.

The tube connection 302 of the terminal attachment is depicted with an inner diameter 304 slightly larger than an outer diameter 306 of the through pin 128. The first custom bracket 102 is also shown attached to the first cargo strap 104 with the bolt 130 running through the second hole pair 126, through the strap loop 144 and secured with the nut 132.

Figure 4:
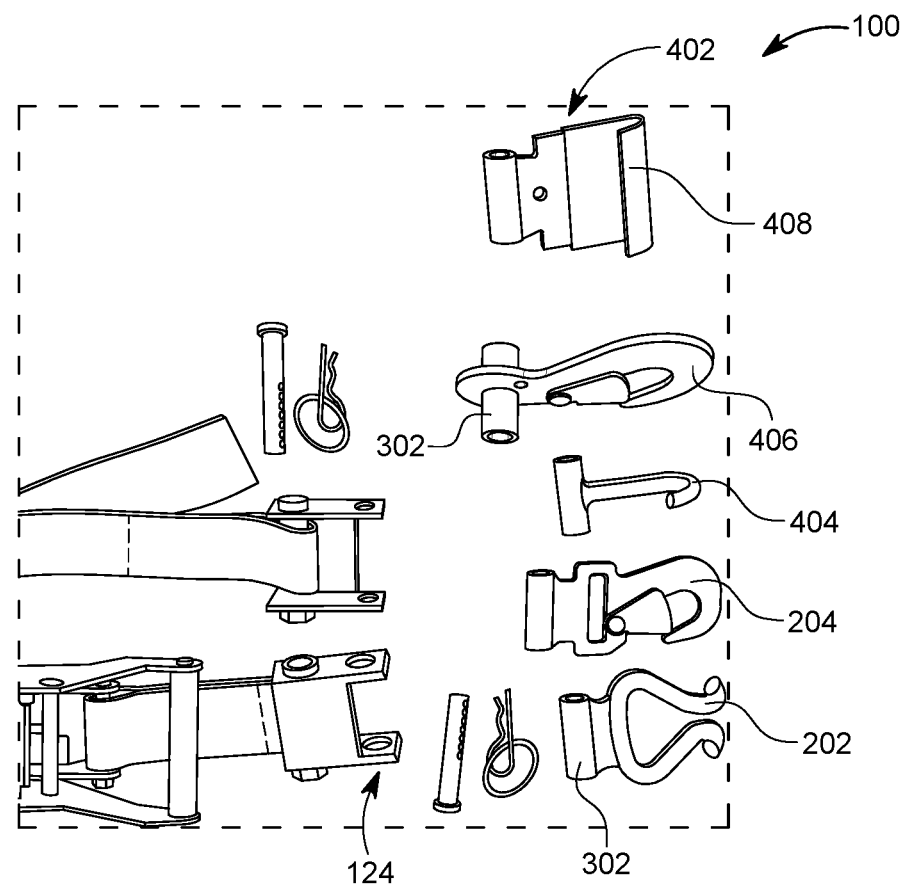
FIG. 4 is an isometric view of the cargo strap system of FIG. 1 in an unassembled configuration with multiple terminal attachments.

Referring now to FIG. 4, therein is shown an isometric view of the cargo strap system 100 of FIG. 1 in an unassembled configuration with multiple terminal attachments 402. The terminal attachments 402 can be the hook attachment 202, the clip attachment 204, a wire hook attachment 404, an orthogonal clip attachment 406, or a flat hook attachment 408.

The hook attachment 202 can have a fixed tube connection 302 wide enough to extend the full length between the first hole pair 124. The clip attachment 204 can have a clip mechanism coupled to a fixed tube connection 302 with a full width between the first hole pair 124.

The wire hook attachment 404 can be formed of a thinner wire and can have the fixed tube connection 302 wide enough to extend the full length between the first hole pair 124. The orthogonal clip attachment 406 can have a clip mechanism orthogonally positioned with respect to the tube connection 302.

The tube connection 302 of the orthogonal clip attachment 406 can be smaller than a full width between the first hole pair 124 to provide a more flexible connection by providing a degree of slippage along the through pin 128. The flat hook attachment 408 can have a wide flat hook that is wider than the tube connection 302 and that would overhang the first hole pair 124 of the custom bracket.

The versatility of the custom brackets enable any of the variety of terminal attachments 402 shown, and not shown, to be mounted and coupled within the first hole pair 124. Depending on the various cargo tie-downs encountered, the user can fit different terminal attachments 402 on the custom bracket. The terminal attachment can be fitted at both ends of the custom bracket as can the cargo strap.

Figure 5:
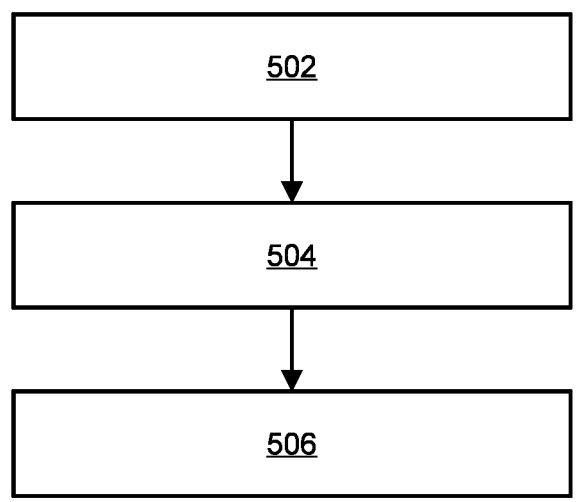
FIG. 5 is a method of manufacturing the interchangeable cargo strap system.

Referring now to FIG. 5, therein is shown a method of manufacturing the interchangeable cargo strap system of the present disclosure. The method of manufacture includes: providing a custom bracket, the custom bracket comprises a first hole pair and a second hole pair, the first hole pair extended through a first side, extended through a second side, and positioned near a top of the custom bracket, the second hole pair extended through the first side, extended through the second side, and positioned near a bottom of the custom bracket in a block 502; coupling a first anchor rod to the first hole pair of the custom bracket for coupling a terminal attachment to the custom bracket in a block 504; and coupling a second anchor rod to the second hole pair of the custom bracket for coupling a cargo strap to the custom bracket in a block 506.

Thus, it has been discovered that the interchangeable cargo strap system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

The interchangeable cargo strap system disclosed herein, provides a much more versatile and functional strap. The interchangeable cargo strap system takes a less space in a user's bag or side box. The interchangeable cargo strap system also utilizes custom terminal attachments at both ends that enable a variety of finishing and hooking attachments to be placed within the custom brackets at each end of the interchangeable cargo strap system.

Further the quick release pin coupled with the through pin can be positioned within the first hole pair the top edge of the custom brackets to ensure that the custom brackets are secured with the terminal attachments. The structure of the custom brackets enables so many different types of terminal attachments to be used.

The custom brackets can also be used for a multitude of tasks that the user desires. Overall, the interchange strap provides many more functional and versatile uses than compared to traditional straps. Further, the interchangeable strap is less cumbersome for users to carry along within their bags or side boxes.

While the interchangeable cargo strap system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. An interchangeable cargo strap system comprising:
  a custom bracket, the custom bracket comprises a first hole pair and a second hole pair, the first hole pair extended through a first side, extended through a second side, and positioned near a top of the custom bracket, the second hole pair extended through the first side, extended through the second side, and positioned near a bottom of the custom bracket;
  a first anchor rod coupled to the first hole pair of the custom bracket for coupling a terminal attachment to the custom bracket, the first anchor rod comprises multiple holes down a length thereof; and a second anchor rod coupled to the second hole pair of the custom bracket for coupling a cargo strap to the custom bracket.

2. The system of claim 1 wherein: the first anchor rod is a thru pin secured with a quick release pin for coupling the terminal attachment to the custom bracket.

3. The system of claim 1 wherein: the second anchor rod is a bolt for coupling the custom bracket to the cargo strap.

4. The system of claim 1 wherein: the first anchor rod is secured with a pin coupled to a keyring loop.

5. An interchangeable cargo strap system comprising:
a custom bracket, the custom bracket comprises a first hole pair and a second hole pair, the first hole pair extended through a first side, extended through a second side, and positioned near a top of the custom bracket, the second hole pair extended through the first side, extended through the second side, and positioned near a bottom of the custom bracket, the custom bracket comprises a notch, the notch exposes the first hole pair from a front side of the custom bracket;

a first anchor rod coupled to the first hole pair of the custom bracket for coupling a terminal attachment to the custom bracket; and a second anchor rod coupled to the second hole pair of the custom bracket for coupling a ratchet through a cargo strap to the custom bracket.

6. The system of claim 5 wherein: the terminal attachment is a clip.

7. The system of claim 5 wherein: the terminal attachment is a hook.

8. The system of claim 5 wherein: the terminal attachment comprises a tube connection with an inner diameter larger than an outer diameter of the first anchor rod.

9. A method of manufacturing an interchangeable cargo strap system comprising:
providing a custom bracket, the custom bracket comprises a first hole pair and a second hole pair, the first hole pair extended through a first side, extended through a second side, and positioned near a top of the custom bracket, the second hole pair extended through the first side, extended through the second side, and positioned near a bottom of the custom bracket;

coupling a first anchor rod to the first hole pair of the custom bracket for coupling a terminal attachment to the custom bracket, the first anchor rod comprising multiple holes down a length thereof; and coupling a second anchor rod to the second hole pair of the custom bracket for coupling a cargo strap to the custom bracket.

10. The method of claim 9 wherein: coupling the first anchor rod includes coupling a thru pin secured with a quick release pin for coupling the terminal attachment to the custom bracket.

11. The method of claim 9 wherein: coupling the second anchor rod includes coupling a bolt for coupling the custom bracket to the cargo strap.

12. The method of claim 9 wherein: coupling the first anchor rod includes securing the first anchor rod with a pin coupled to a keyring loop.

13. The method of claim 9 wherein: coupling the second anchor rod includes coupling the second anchor rod configured to couple the custom bracket to a ratchet through the cargo strap.

14. The method of claim 13 wherein: coupling the first anchor rod includes coupling the first anchor rod configured to couple a clip to the custom bracket.

15. The method of claim 13 wherein: coupling the first anchor rod includes coupling the first anchor rod configured to couple a hook to the custom bracket.

16. The method of claim 13 wherein: coupling the first anchor rod includes coupling the first anchor rod configured to couple with a tube connection having an inner diameter larger than an outer diameter of the first anchor rod.

17. The method of claim 13 wherein: providing the custom bracket includes providing the custom bracket comprising a notch exposing the first hole pair from a front side of the custom bracket.

* * * * *